June 2, 1942. A. WELBLUND ET AL 2,284,703
METHOD FOR CONTINUOUSLY MOLDING METALS
Original Filed June 1, 1938 9 Sheets-Sheet 1

INVENTORS
Albert Welblund
Fred Benard
BY
A. A. Weller
ATTORNEY.

June 2, 1942.   A. WELBLUND ET AL   2,284,703
METHOD FOR CONTINUOUSLY MOLDING METALS
Original Filed June 1, 1938   9 Sheets-Sheet 3
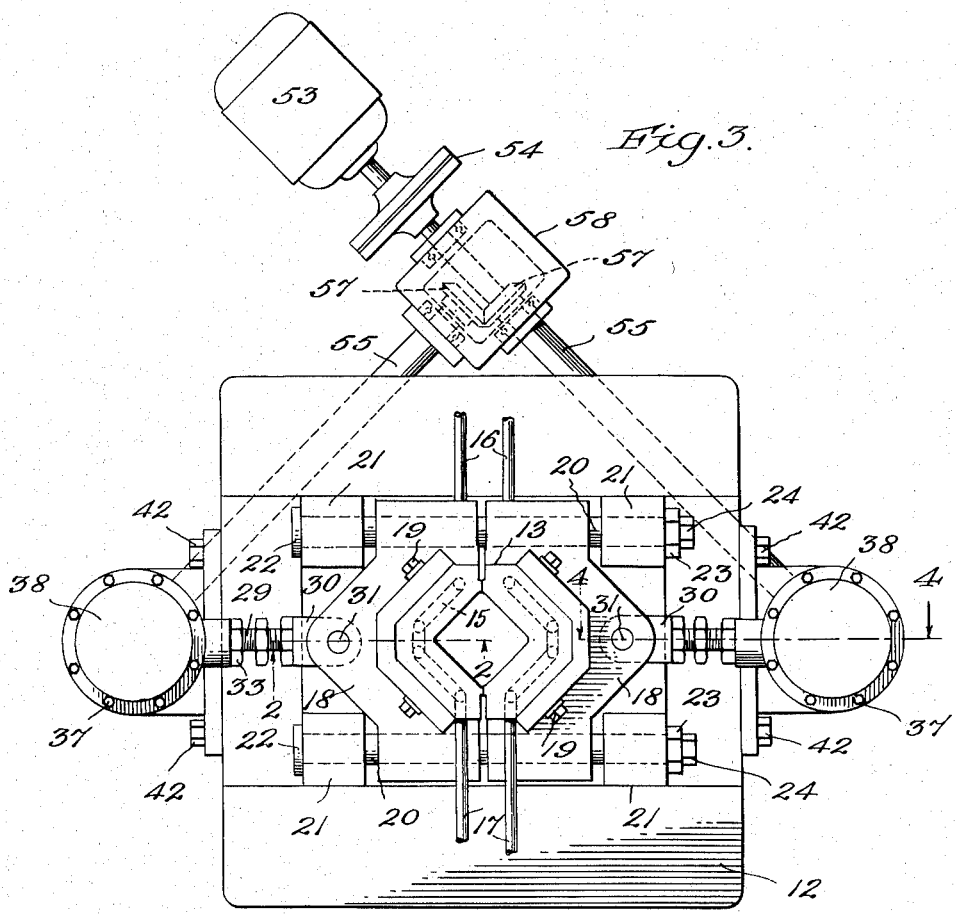
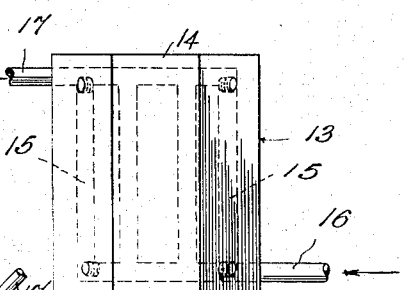
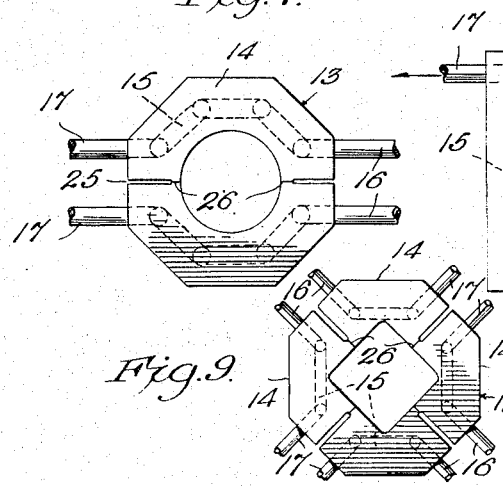
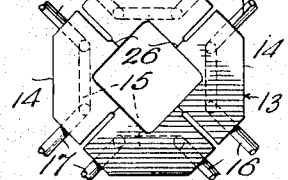
INVENTORS
Albert Welblund
Fred Benard
BY
ATTORNEY

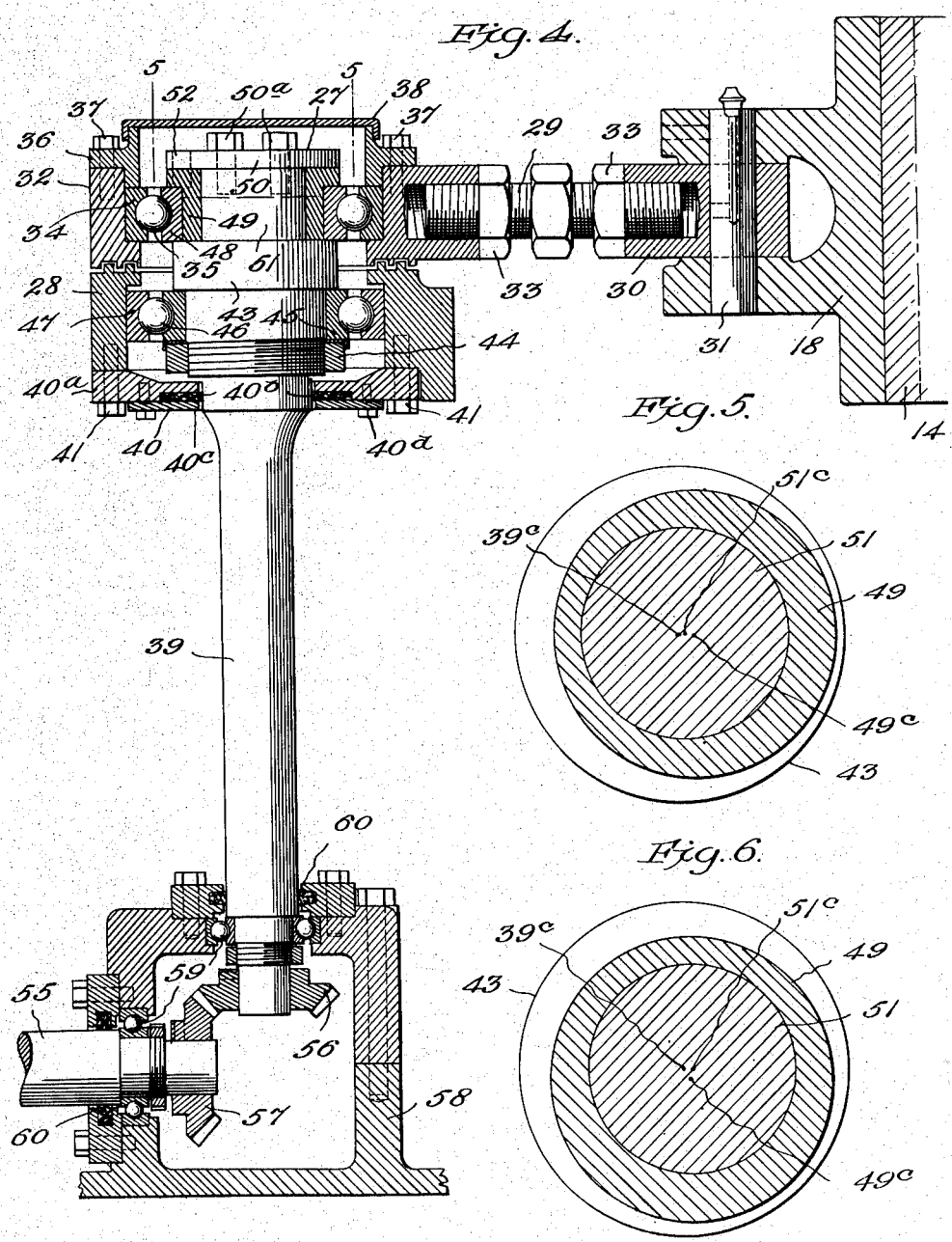

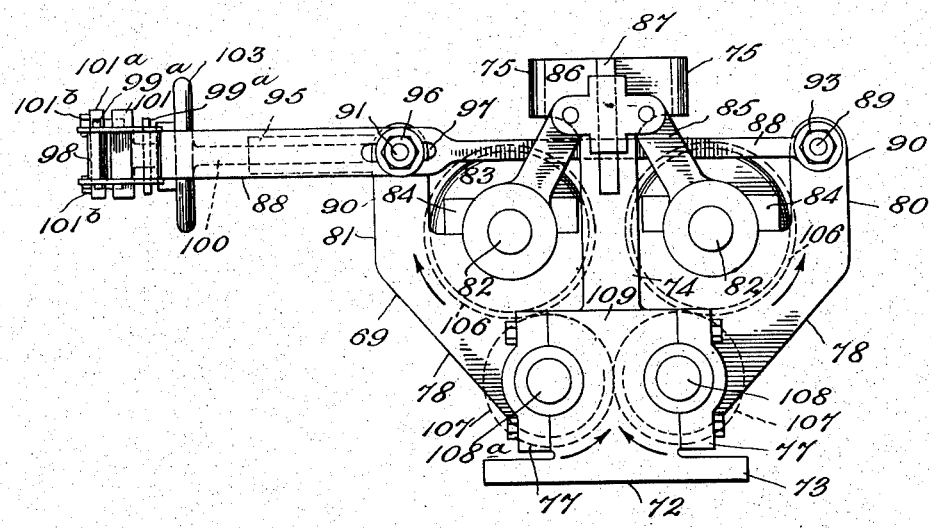
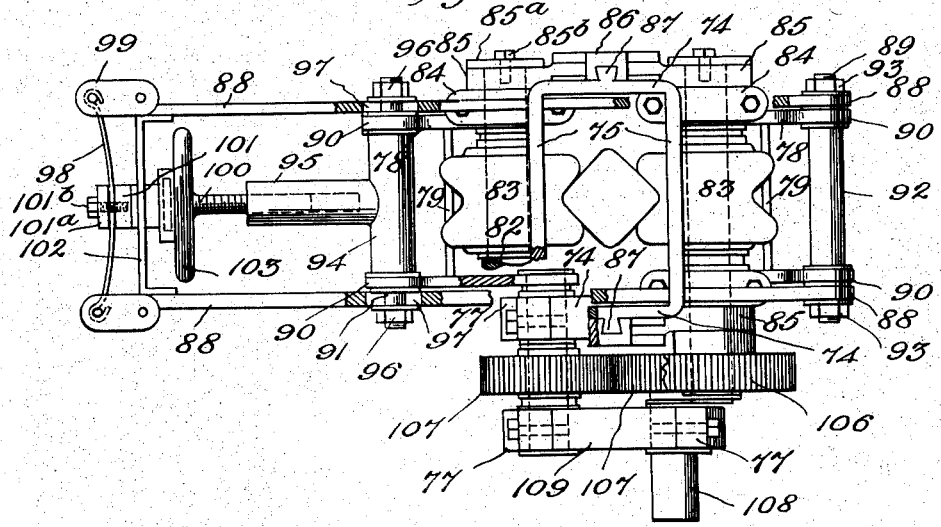

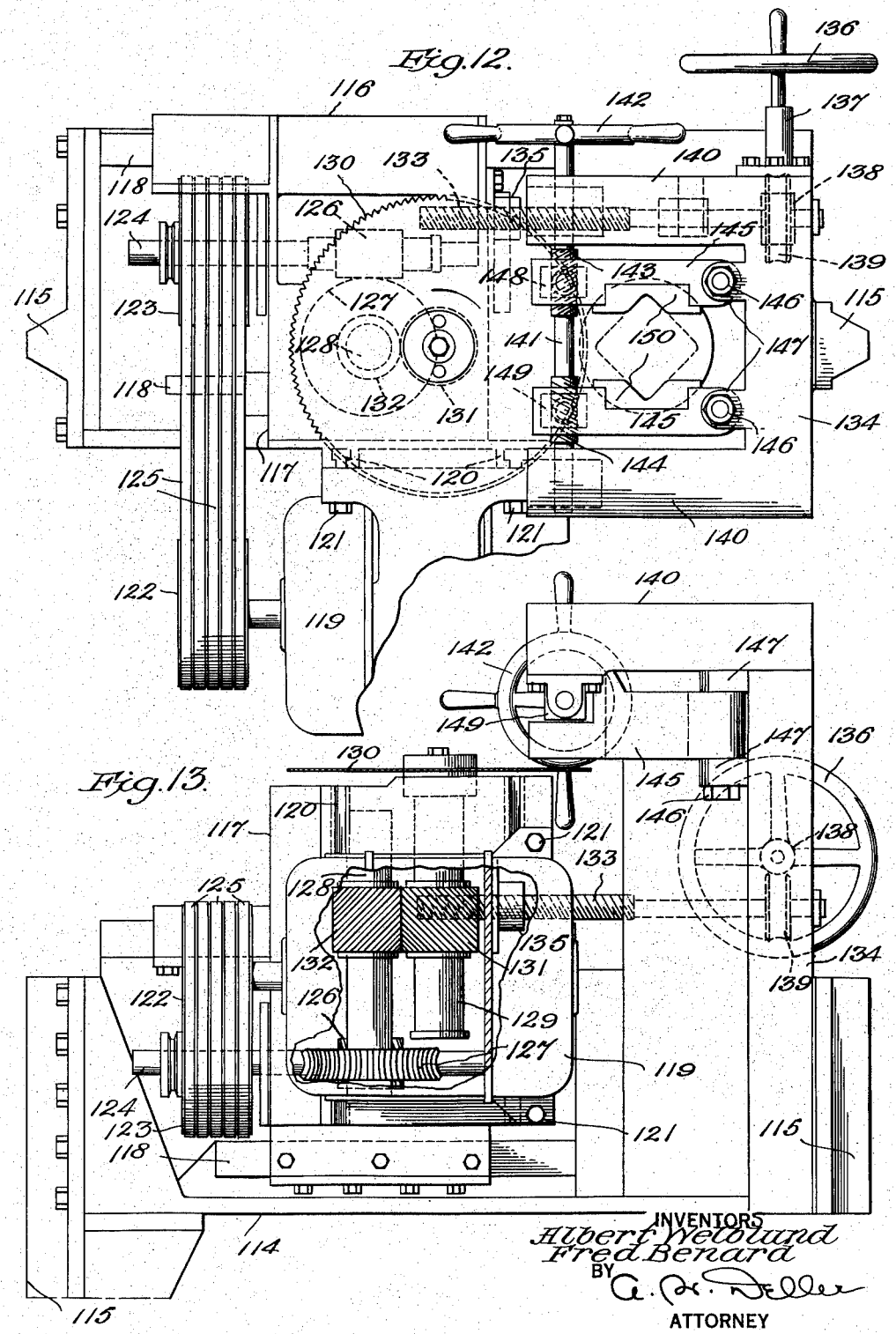

June 2, 1942.  A. WELBLUND ET AL  2,284,703
METHOD FOR CONTINUOUSLY MOLDING METALS
Original Filed June 1, 1938  9 Sheets-Sheet 7
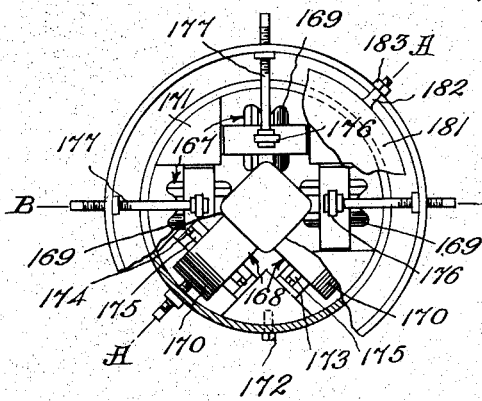
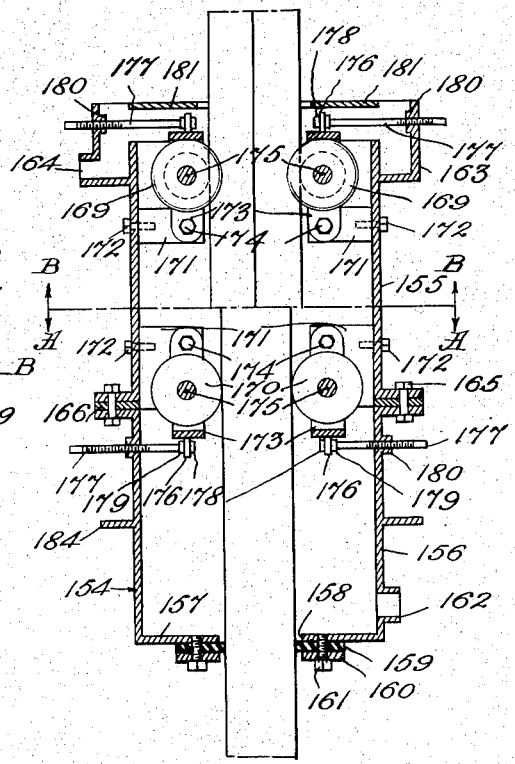
INVENTORS
Albert Welblund
Fred Benard
BY
ATTORNEY.

June 2, 1942.  A. WELBLUND ET AL  2,284,703
METHOD FOR CONTINUOUSLY MOLDING METALS
Original Filed June 1, 1938  9 Sheets-Sheet 8

INVENTORS
Albert Welblund
Fred Benard
BY
ATTORNEY.

June 2, 1942.  A. WELBLUND ET AL  2,284,703
METHOD FOR CONTINUOUSLY MOLDING METALS
Original Filed June 1, 1938  9 Sheets-Sheet 9

INVENTORS
Albert Welblund
Fred Benard
BY
ATTORNEY.

Patented June 2, 1942

2,284,703

UNITED STATES PATENT OFFICE 2,284,703

METHOD FOR CONTINUOUSLY MOLDING METALS

Albert Welblund and Fred Benard, Sudbury, Ontario, Canada, assignors to The International Nickel Company of Canada, Limited, Copper Cliff, Ontario, Canada, a company of Canada Original application June 1, 1938, Serial No. 211,116. Divided and this application December 3, 1940, Serial No. 368,294. In Canada May 20, 1938

11 Claims. (Cl. 22—200.1)

The present invention relates to a method of continuously molding metal and, more particularly, to a method of making a sound continuous elongated shape or casting of copper, especially superior in properties to a standard horizontal or vertical casting of customary electrolytic copper of standard quality produced in a conventional copper refinery.

Heretofore many attempts have been made to cast metals and alloys in the form of a continuous casting or shape rather than as individual castings or shapes. The theoretical advantages of casting metal in the form of a continuous casting or shape over the almost universal commercial practice of casting in individual casting or shape molds are many, including savings in capital invested in plants and equipment, economies in operation, elimination or minimizing of rejected metal and scrap metal such as croppings, sink heads, scalpings, etc., and the production of a more uniform product. Despite earnest endeavors of many workers in the art to design apparatus and to discover methods for utilizing these advantages, the solution of this outstanding problem remained unaccomplished, at least so far as satisfactory commercial operation on an industrial scale was concerned. One of the principal operational difficulties was the sticking or adherence of the solidified metal to the wall of the mold. When the extent of the sticking was so great that the withdrawing mechanism could no longer pull the casting or shape out without damaging the surface of the casting or shape, a break or rupture in the continuity of the process resulted and it was often necessary to destroy the mold in order to free the casting or shape. On the other hand, when the withdrawing mechanism continued to pull the casting or shape out, the solidified skin would rupture. A rupture outside the mold permitted the still molten metal to gush forth in uncontrollable streams causing damage to equipment and injury or even death to the operators. While not so disastrous, ruptures within the mold permitted the metal in the still molten core to flow to the mold wall through the rupture, forming an unsatisfactory and commercially unacceptable product. The process, moreover, could not continue satisfactorily after pieces of the skin had frozen fast to the mold wall.

We have discovered that sticking or adherence of the solidifying skin of a continuously molded casting or shape to the wall of the mold may be effectively prevented by using a longitudinally divided mold whose sections are given a relatively slight but rapid vibration transversely to the direction of motion of the casting or shape and that this variation in the cross-section of the mold, contrary to expectations, does not have a deleterious but rather a beneficial effect on the surface appearance and physical properties of the molded metal.

It is an object of the invention to provide a method of making a continuous ingot, casting or shape which is substantially free from flaws, pipes, etc. and which is characterized by longitudinal uniformity in density, oxygen content, electrical conductivity, physical properties, etc. and preferably by substantial symmetry of metallographic structure in cross-section.

The invention has for a further object the production of elongated copper or other metal or alloy castings or shapes having a metallographic structure comprising a relatively small central core of columnar crystals arranged substantially parallel to the longitudinal axis of the casting or shape, a relatively large "sunburst" of columnar crystals surrounding the central core and arranged substantially perpendicular to the walls of the mold, a relatively narrow band of small crystals or grains adjacent to the outer periphery of the casting or shape, and an external surface skin coating the exposed portions of the casting or shape.

It is another object of the invention to provide a method of producing continuous, elongated hollow or tubular castings or shapes which are substantially free from flaws, defects, etc. and that possess longitudinal uniformity in density, oxygen content, physical properties, etc. and preferably substantial symmetry of metallographic structure in cross-section.

Moreover, the invention provides a method of making a sound continuous ingot, casting or shape in a sectional mold, the sections of which vibrate substantially transversely to the longitudinal axis of the ingot, casting or shape, said method being capable of producing continuous ingots, castings and shapes at satisfactory speeds for commercial production on an industrial scale.

Other objects and advantages of the invention will become apparent from the following description taken in conjunction with the drawings, in which:

Fig. 3 depicts a top plan view of the apparatus shown in Fig. 2;

Fig. 4 shows an enlarged sectional view of the means for vibrating the mold taken substantially along the line 4—4 of Fig. 3;

Figs. 5 and 6 are sectional views on the line 5—5 of Fig. 4, with certain parts omitted for the sake of clarity, showing the arrangement of eccentric parts in two different positions of adjustment for varying the extent of vibration of the mold sections;

Figs. 7 and 8 represent, respectively, top and side views of a two section mold for molding cylindrical ingots, castings and shapes;

Fig. 9 illustrates a top plan view of a four section mold for molding ingots, castings and shapes of quadrilateral cross-section;

Fig. 10 is a side elevational view on an enlarged scale of the withdrawal device, looking toward the left in Fig. 2 with the gears removed for sake of clarity but their positions indicated in dotted outline;

Fig. 11 is a top plan view of the withdrawal device shown in Fig. 10, with certain parts omitted and broken away to more clearly disclose the means for varying the pressure on the rollers;

Fig. 12 shows a top plan view and Fig. 13 a side elevation view of a power saw and associated parts mounted on a movable carriage for severing the continuously molded ingot, casting or shape into convenient lengths, certain parts being broken away to reveal normally concealed parts;

Fig. 14 illustrates a top plan view, with certain parts broken away to reveal structure on a lower plane of a modified form of cooling device into which the ingot or casting is conducted upon leaving the dynamic mold;

Fig. 15 is a vertical sectional view of the cooling device illustrated in Fig. 14, the portion above the line AB—AB being taken along line B—B and the portion below line AB—AB being taken along line A—A of Fig. 14;

Fig. 16 represents a photomacrograph of a cross section and Fig. 17 that of a longitudinal section of a copper ingot molded by the process embodying the present invention;

Figure 20:
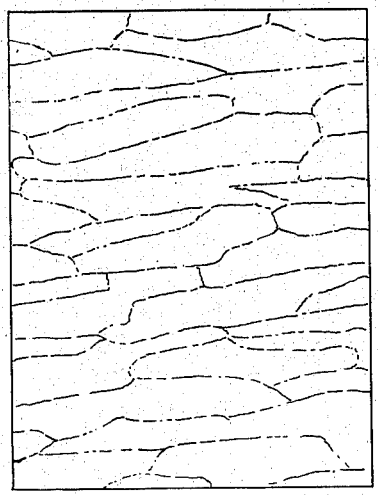
Figure 21:
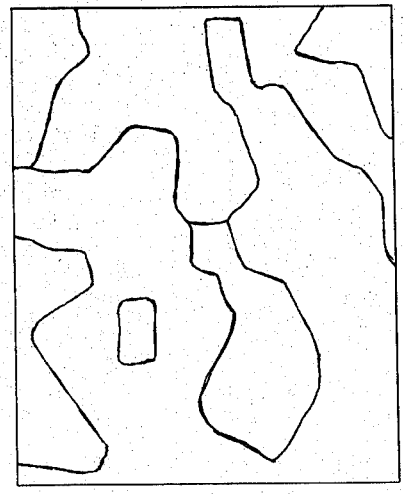
Figure 19:
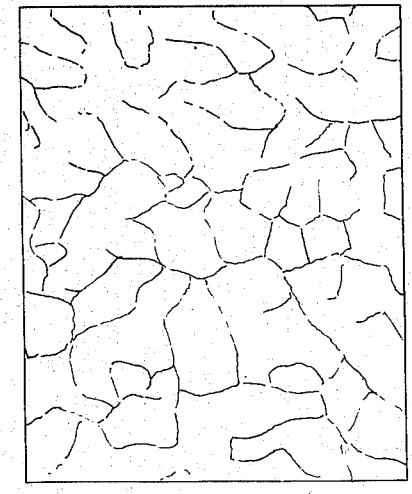
Figure 23:
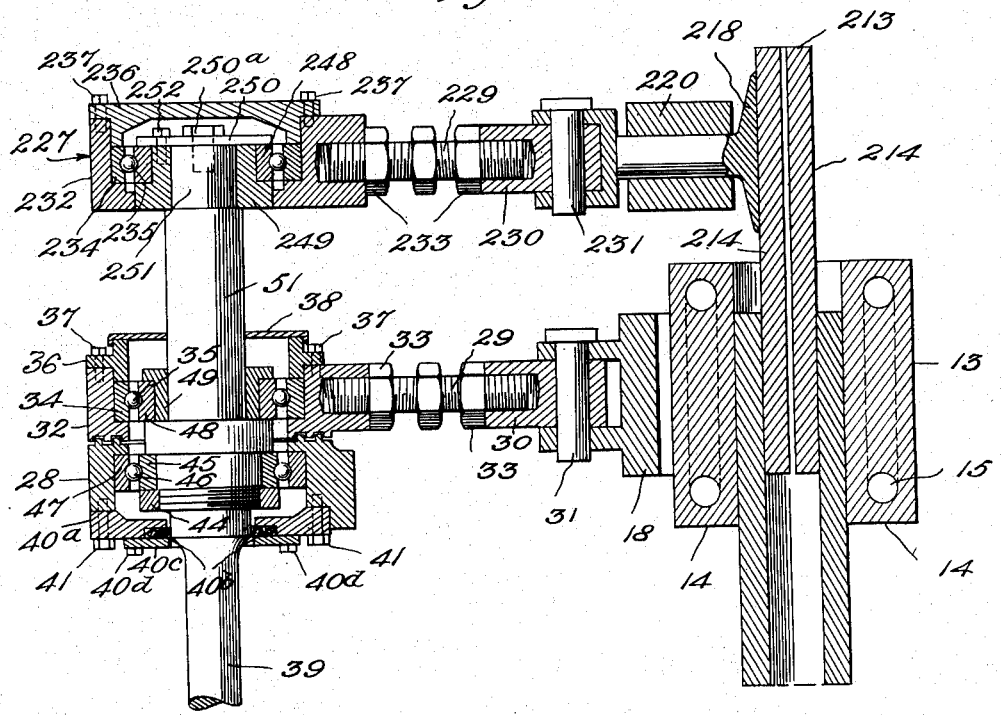
Figure 22:
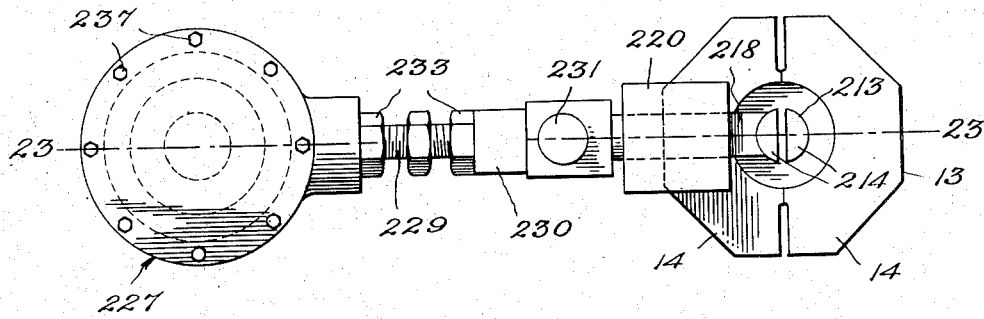

Figs. 19 and 20 show the structure of the casting in horizontal section about 0.08 inch and about 0.5 inch from the surface skin, respectively, at magnifications of about 100 diameters;

Fig. 21 is a representation of the grain or crystal structure in cross-section at the center of the casting at a magnification of about 750 diameters;

Fig. 22 depicts a top plan view of a modification of the apparatus adapted for molding hollow or tubular ingots, castings or shapes, certain parts being omitted; and Fig. 23 is a vertical sectional view along the line 23—23 of Fig. 22.

Generally speaking, the method of the present invention contemplates the production of elongated ingots, castings and shapes of metals and alloys. As carried into practice the invention comprises introducing molten metal into a confining space where heat is abstracted to cause the metal to solidify into an ingot, casting or shape having a cross-sectional contour substantially conforming to that of the confining space and, during the period of solidification, alternately increasing and decreasing the cross section of said space to prevent adherence of the solidifying metal to the walls defining said space. For molding ingots, castings and shapes of longer axial length than the confining space, the molten metal is preferably introduced continuously at at rate correlated with the rate of solidification and withdrawal of the solidified metal from the confining space. Where the axis of the confining space is more or less vertical, it is necessary to support the ingot, casting or shape as it is being withdrawn to prevent the whole body of metal from falling out of the confining space. By regulating the supporting and withdrawing forces acting on the solidified metal it is easy to control the rate of withdrawal from the confining space and to correlate it with the rate of solidification of the molten metal. Continuity of operation can be maintained by severing selected lengths from the end of the moving ingot, casting or shape.

A suitable apparatus for carrying out the process of the present invention is disclosed in and forms the subject matter of the claims of our prior copending application, Serial No. 211,116, filed June 1, 1938, of which the present application is a division. The apparatus includes a dynamic mold constituted of a plurality of mating sections which are vibrated in coordination with each other. The vibrations may be imparted to the sections in any appropriate manner, such as mechanically, electrically, pneumatically, or the like. The mating sections of the mold define an open ended chamber, the cross section of which constitutes the shape on a transverse plane of the ingot casting or the like, which is to be made. One end of the mold is open to permit the continuous introduction of molten metal therein and the other end of the mold is likewise open to enable the continuous ingot, casting or shape to be withdrawn continuously. The bottom of the mold is initially closed with a starting plug or dummy bar. As the continuous casting is produced, the starting plug or dummy bar is continuously moved away from the withdrawal end of the dynamic mold. This movement may be accomplished in any suitable manner, such as by advancing or pinch rollers driven by suitable mechanism, by jack screw which is associated with appropriate means, etc.

In operating the apparatus molten copper or another metal or alloy may be poured continuously into the mold while the sections are vibrated. These sections mate with each other so closely that there is substantially no clearance between them in the closed position although they preferably do not actually touch. By subjecting the sections to coordinated vibration of small amplitude and preferably approximately constant frequency, no fin or other projection is formed on the surface of the ingot, casting or shape. The sections of the mold are made of a metal or alloy advantageously of high thermal conductivity such as copper or its alloys and are cooled, preferably by passing water or other cooling fluid upwardly through a tortuous path in a cooling jacket or channel formed in the interior of each section. By the time the metal arrives at the bottom of the mold, it is solidified in the form of a dense ingot, casting or shape.

To set the apparatus into operation, a sufficient amount of solidified metal is allowed to accumulate within the mold above a starting plug or dummy bar which is then moved at a speed coordinated with the rate of solidification of the metal within the mold and the rate at which the molten metal is poured into the mold. In other words, the solidified ingot, casting or shape is moved from the mold as it is formed. The continuous ingot, casting or shape thus produced has high density throughout its cross section and every region is autogeneously bonded to or integrally united with an adjacent region. Furthermore, the skin on the outer surface of the casting is continuous and is substantially free from ruptures, cracks, fissures and other defects.

Figure 1:
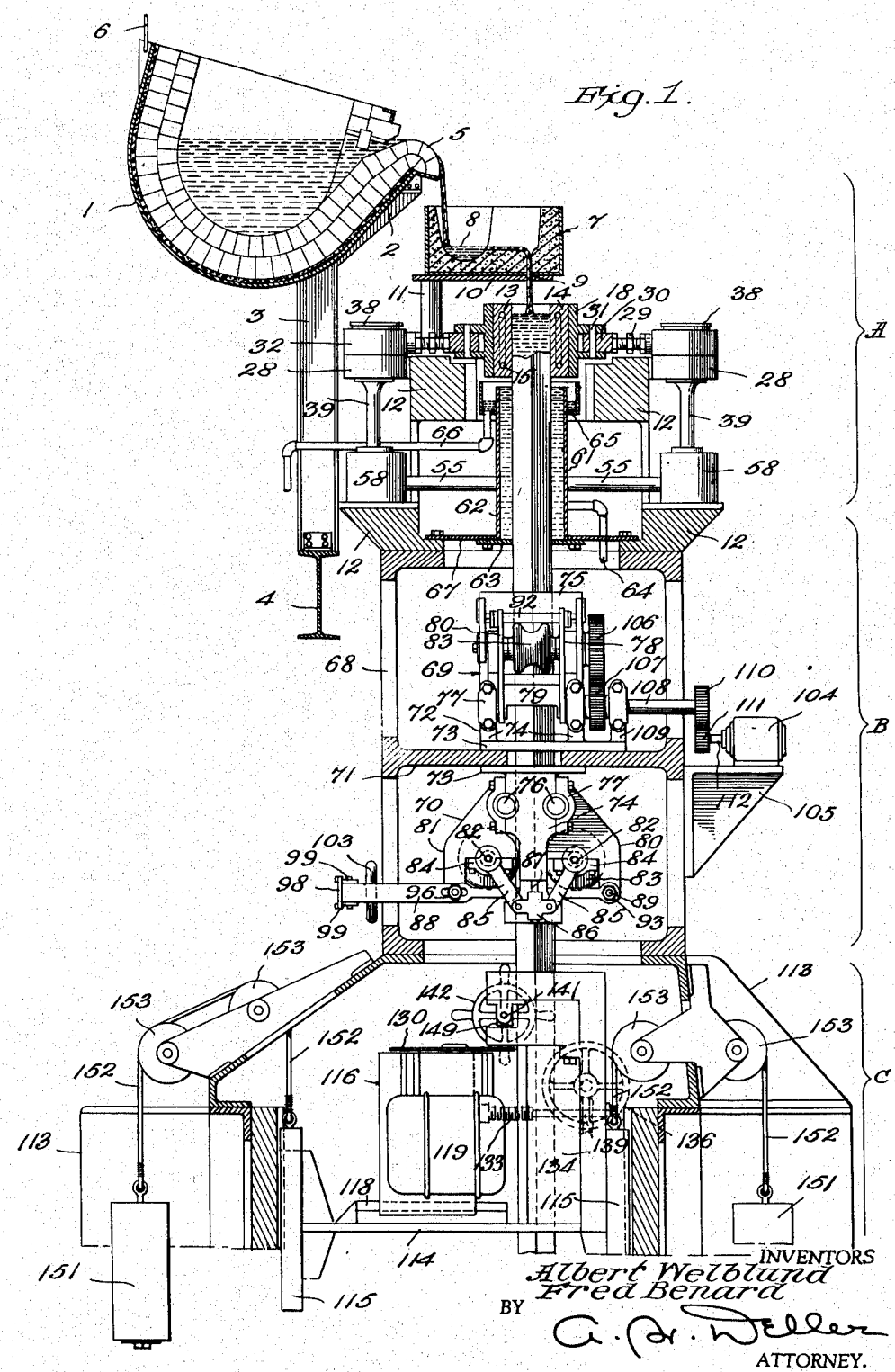
Fig. 1 illustrates a somewhat diagrammatic composite side elevational view, partly in section of an apparatus adapted to carry out the present invention.

Referring more particularly to Fig. 1, it will be seen that the apparatus comprises three main divisions or units. In actual practice, it is convenient to construct the divisions or units in superimposed vertical relationship to each other. The upper division or unit, indicated generally by reference character A, comprises the apparatus for pouring, molding and solidifying the metal. Thereunder is located the intermediate division or unit designated generally by the reference character B which includes means for withdrawing the ingot, casting or shape from division or unit A at a properly correlated speed and feeding it into the lower division or unit, marked C as a whole, where a device is mounted for severing the ingot, casting or shape into desired lengths as it is moving. For convenience, the apparatus will be described in greater detail under these three divisions or units.

Division or unit A includes a furnace or ladle 1 tiltably mounted upon brackets 2 which are secured to uprights or structural columns 3. A main beam 4 supports and holds the uprights 3 in proper position. The furnace 1 may be of any suitable type for preparing and/or holding a considerable quantity of metal to be molded at the proper temperature and under proper conditions for pouring, as will be well understood by those skilled in the art. It is preferred to use an electric furnace such as an arc furnace or an induction furnace. A pouring lip or spout 5 is provided on furnace 1 adapted to direct a stream of molten metal from the furnace when it is tilted by raising cable 6, or by any other appropriate tilting means. Below lip 5 is a pouring vessel 7 having a pool 8, into which the stream of metal from the spout 5 falls, and having an outlet 9. Supporting the pouring vessel 7 is a pouring platform 10 mounted upon a post 11 which forms part of framework 12 of the upper division or unit A. The quantity of molten metal flowing from outlet 9 per unit of time may be controlled by varying the height of the molten metal in pool 8, which in turn depends upon the rate of flow of metal from the furnace 1. The pouring vessel 7 is not indispensable but it facilitates controlling the direction and rate of flow of the stream of metal into a mold to be described hereinafter. Any other suitable arrangement of furnaces, ladles, etc. which would enable an operator to direct a regulable continuous stream of molten metal at the proper temperature into the mold could be used in place of the aforesaid apparatus as is obvious to those skilled in the art. Thus, an under pour or enclosed ladle with a skimming bridge may be used to insure pure metal free from slag, oxides, contamination, etc., etc.

Reference character 13 is the general designation of an open ended dynamic mold into which the stream of molten metal from outlet 9 of the pouring vessel 7 is directed through the upper end and from the lower end of which a continuous molded ingot, casting or shape of solidified metal is withdrawn. The dynamic mold 13 is constituted of a plurality of mating sections 14. (See Figs. 7, 8 and 9.) The number of sections may vary depending upon the size and configuration of the ingot, casting, shape or the like which is to be produced. Satisfactory results have been obtained with molds having two sections such as illustrated in Figs. 7 and 8 and four sections as shown in Fig. 9. As stated hereinbefore, the mold sections may be made of any suitable metal or alloy. Silver and silver alloys, copper and copper alloys, etc., which have relatively high thermal conductivity may be used to advantage. Clad and plated or coated metals may also be successfully employed for the mold sections, for example, a copper-cadmium alloy mold with a facing of electrodeposited chromium gave good results in practice. The facing or coating metal or alloy may be applied by electrodeposition, spraying, etc., as those skilled in the art will understand.

The apparatus illustrated for vibrating the mold sections is adapted for use with a two section mold, as may be clearly seen in Fig. 3, but it is evident that it may be modified without invention to accommodate molds of any desired number of sections. The shape of the ingot desired will determine the shape of the mold cavity which may be quadrilateral as in Fig. 3, circular as in Fig. 7 or any other desired shape. Each mold section is provided with a cooling channel 15, an inlet 16 to admit cooling water or other fluid from any suitable source and an outlet 17 through which the warm or heated cooling water is discharged (see Figs. 3, 7, 8 and 9). Machine screws 19 secure each mold section to a yoke 18 which is adapted to reciprocate or move back and forth upon supporting guide rods 20 whose ends pass through and are supported by openings in pedestals 21 forming part of the framework 12, as may be clearly seen in Figs. 2 and 3. The rods 20 are conveniently made in the form of long bolts having heads 22 at one end abutting against the adjacent pedestals with nuts 23 and lock nuts 24 at the other end likewise abutting against the adjacent pedestals and holding the parts in assembled relation. The ends of the yokes 18 have cylindrical bores provided with bearing surfaces accurately fitting around rods 20 so as to minimize undesirable vibration. In order to provide space for reciprocation of the mold sections, each end of the yokes 18 is somewhat narrower than half the length of bar 20 extending between the pedestals 21 (see Fig. 3). Preferably, the yokes do not touch each other in the position of minimum clearance and the contacting surfaces of the mold sections are advantageously rabbeted as at 25 to form relatively narrow contact flanges 26 to assure a tight joint between the mold sections in this position (see Figs. 3, 7 and 9). The contacting surfaces of the mold sections are shown as longitudinal splits or joints between adjacent sections. This split or joint may be parallel to the vertical axis of the mold, or may be inclined at any angle, or may be of any appropriate shape, provided the sections are mated. The yokes and associated parts rigidly support the mold sections 14 in an upright position at all stages of the reciprocating movement.

Rotating eccentrics, indicated generally by reference numeral 27 are mounted in housings 28 on framework 12 and are adapted to impart the desired reciprocatory motion to the yokes 18 through connecting rods 29 (see Fig. 4). Each connecting rod is articulated to the corresponding yoke by means of a cross-head 30 and a wrist pin 31 as clearly shown in Figs. 1, 2 and particularly 4. The ends of the connecting rod 29 are advantageously provided with right and left hand threads, which are screwed into suitably drilled and tapped holes in cross-head 30 and an eccentric head 32, respectively. Locknuts 33 lock the connecting rod and associated parts in any desired position of adjustment.

Figure 2:
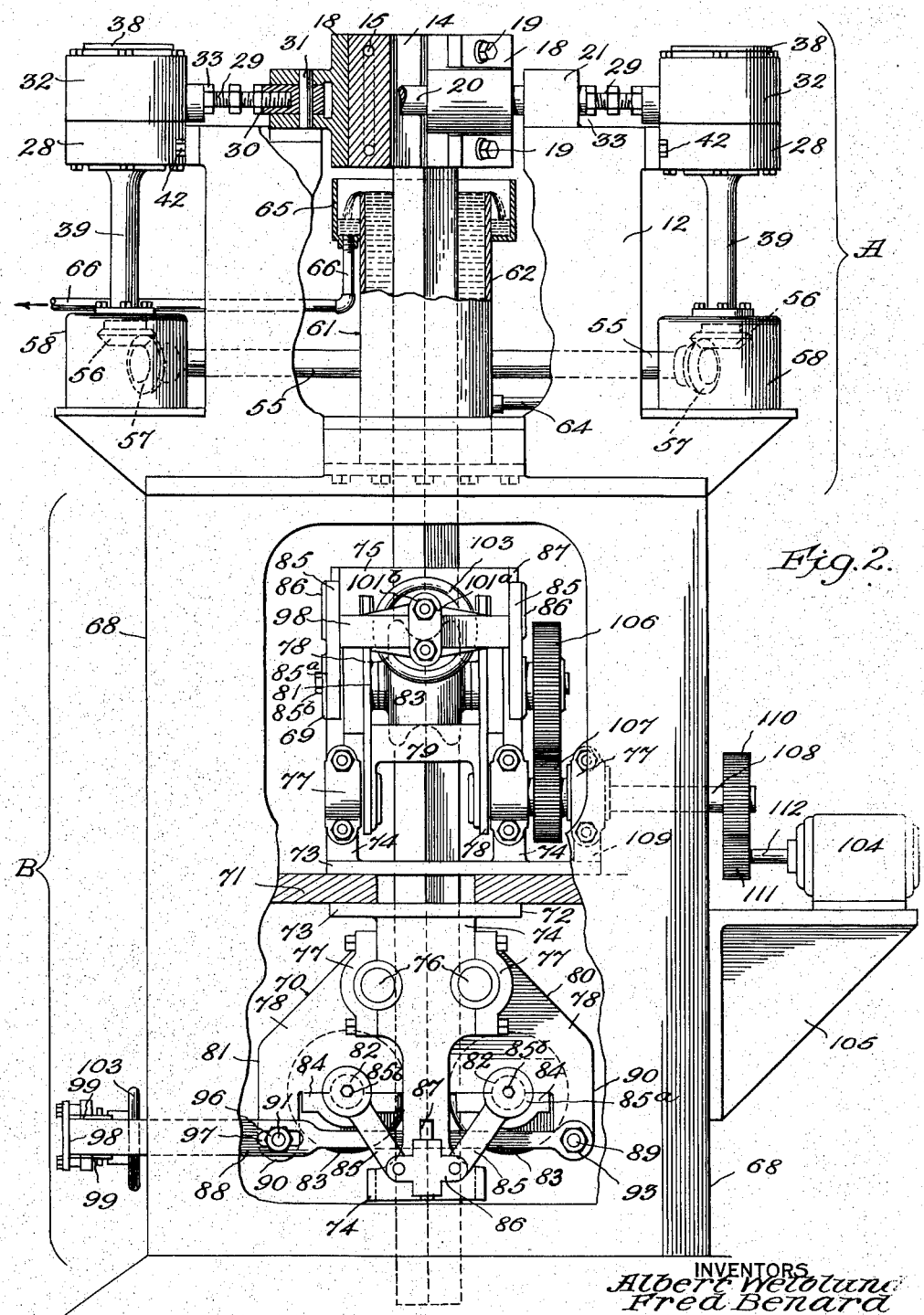
Fig. 2 is a side elevational view of the upper part of the apparatus illustrated in Fig. 1 drawn on an enlarged scale with certain parts omitted or broken away for the sake of clarity and with certain portions in section along the line 2—2 of Fig. 3.

The eccentric head 32 may advantageously be an annular forging with a projection in which a tapped hole is provided to receive an end of the connecting rod 29 as shown in Figs. 2, 3 and 4. By providing the inner surface of the eccentric head with a rabbet, a shoulder is formed on which an outer race 34 of a ball bearing 35 may rest and be firmly held by a ring clamp 36 and cap screws 37. A top cover plate 38 is appropriately secured to the ring clamp 36 to close the upper end as illustrated in Fig. 4. The contacting faces of housing 28 and eccentric head 32 are provided with loosely fitting tongues and grooves, the amount of play slightly exceeding the maximum throw of the eccentric 27. This structure, as clearly seen in Fig. 4, permits the free movement in any horizontal direction of the eccentric head 32, but at the same time prevents accidental displacement thereof from housing 28 during repairs, adjustments, etc.

The eccentrics 27 are secured to and driven by shafts 39 which extend into the housings 28 from the bottom thereof. To close the lower end of the housing 28, a bottom cover 40 is fastened thereto by cap screws 41 while cap screws 42 secure housing 28 to the framework 12. As seen more clearly in Fig. 4, the bottom cover may comprise a main plate 40a, a felt or other fibrous packing ring 40b such as asbestos, rubberized asbestos and the like, and a retaining ring 40c appropriately held together by a plurality of machine screws 40d. The felt packing ring 40b tightly engages shaft 39 to prevent the escape of lubricating agents from the housing 28.

Each shaft 39 is provided with a collar 43 near its upper end. Against the lower side of collar 43, a lock nut 44 holds an inner race 45 of a ball bearing 46, the outer race 47 of which is secured in any appropriate manner to the inner wall of housing 28, while against the upper side of collar 43 the inner race 48 of ball bearing 35 is held by a flanged eccentric ring 49 and a disc 50. The end 51 of shaft 39 which extends beyond collar 43 is eccentric with respect to the axis of the shaft. The inner and outer walls of eccentric ring 49, which fits down over the end 51, are eccentric with respect to each other. This is clearly illustrated in Figs. 5 and 6 where the degree of eccentricity has been exaggerated in order to illustrate the principle of this phase of the invention. These views are taken on the line 5—5 of Fig. 4 with the inner race 48 of ball bearing 35 removed for sake of clarity. The outer circle therefore represents the periphery of collar 43 which is concentric with the shaft 39, this common center being indicated by the reference character 39c. The inner circle represents the periphery of the eccentric end 51 which has its center off-set from center 39c of shaft 39 as shown at 51c which also represents the center of the inner wall of the eccentric ring 49. The center of the outer periphery of eccentric ring 49 is off-set as shown at 49c. By rotating the eccentric ring 49 with respect to the shaft 39, the amplitude of the reciprocatory motion imparted to the cross heads 30 may be varied, as clearly illustrated in these figures. In Fig. 5 the position of maximum throw is shown, i. e., center 49c of eccentric ring 49 is as far from center 39c of shaft 39 as possible, while in Fig. 6 an intermediate position is depicted. It is evident that by making the distance from 39c to 51c the same as the distance from 51c to 49c, it is possible to obtain any desired degree of eccentricity from zero to twice this said distance by rotating the eccentric ring 49 through 180° with respect to the shaft 39. A convenient means for locking eccentric ring 49 in any desired position of adjustment comprises a set screw 52 adapted to be inserted through disc 50 into any one of a plurality of holes provided in the top of ring 49. Since disc 50 is fixed to the end 51 of shaft 39 by two or more cap screws 50a, it will be seen that eccentric ring 49 is thereby securely held in the desired position relative to the shaft 39 (see Fig. 4).

Rotation may be imparted to shaft 39 by any appropriate means, such as an electric motor 53, through a flexible coupling 54, shafts 55 and bevel gears 56 and 57 keyed or otherwise fixedly secured to shafts 39 and 55, respectively (see Figs. 3 and 4). Gear boxes 58 are affixed to framework 12 to house the gears 56 and 57 and to provide mountings for bearings 59 in which shafts 39 and 55 are journaled. To assure quieter and more efficient operation, the gear boxes 58 are preferably filled with some suitable gear lubricant which is prevented from escaping by oil seals 60.

Fig. 3 shows a convenient arrangement of the parts for vibrating the mold which has proved satisfactory with a two section mold. In certain instances when it is desired to use a four section mold of the type shown in Fig. 9, the arrangement of Fig. 3 is modified, for example, by including a further rotating eccentric 27 and associated parts at each of the two other sides of the framework 12 and by arranging the shafts 55 approximately parallel to the sides of framework 12 to drive the four shafts 39, as will be apparent to those skilled in the art.

The molded ingot, casting or shape still retains considerable heat as it leaves the dynamic mold. In order to abstract the excess heat before the ingot enters the withdrawing means in division or unit B, a cooling device indicated generally by reference numeral 61 is provided beneath the dynamic mold. Conveniently, cooling device 61 may comprise an open ended container 62 having a dam 63 at the lower end made of rubber, rubberized asbestos, or other suitable yielding material, a water supply conduit 64 opening into the container 62 adjacent the dam 63, an overflow basin or trough 65 surrounding the upper end of the container 62 and a drain pipe 66 leading from the bottom of the overflow basin, as seen in Figs. 1 and 2. The dam 63 is provided with an opening corresponding in shape to the cross section of the ingot, casting or shape to prevent escape of the cooling fluid while permitting the ingot, casting or shape to pass therethrough. Supporting member or means 67 is provided to position the cooling device 61 and to secure it to framework 12.

Division or unit B includes a framework 68, preferably of cast iron or steel, having suitable uprights and cross members to form a sturdy, rigid support for division or unit A as well as a mounting for a withdrawing or feed device indicated generally by reference numeral 69 and a guide designated as a whole by reference numeral 70. Cross members of framework 68 may form a platform 71 on which both the feed device 69 and guide 70 are mounted.

Feed device 69 and guide 70 have the same structure except for the driving means of the feed device 69 which are not necessary in the guide 70. For purposes of illustration, the feed device 69 is set at right angles to the guide 70 in Figs. 1 and 2 so that front and side views may be seen, although this arrangement need not be followed in practice. Fig. 10 shows the withdrawal device 69 on a larger scale looking toward the left of Figs. 1 and 2 with the gears removed for the sake of clarity. Corresponding parts in the two mechanisms have been given the same reference numerals.

A support 72 comprises a base 73, two uprights 74 secured at one end to the base 73 and two cross bars 75 joining the other ends of uprights 74 and forming therewith an opening through which the ingot may pass, as seen in Fig. 11. The base 73 is rigidly fastened to platform 71 and each has an opening to allow the ingot to pass. A stub shaft 76 is mounted at each side of each upright 74 adjacent the base 73 by means of clamps 77, the four stub shafts extending inwardly and being aligned in pairs at the corresponding sides of uprights 74. On each stub shaft is journaled one end of a toggle arm 78. Spacers 79 connect the two arms 78 that are journaled to the paired or aligned stub shafts, thus forming two swinging frames 80 and 81, one on either side of the ingot. Trunnions 82 of rollers 83 are journaled on each of the swinging frames 80 and 81 adjacent the swinging end by bearing caps 84. The trunnions 82 are shown extending beyond the toggle arm 78 and on each extension is rotatably mounted one end of a further toggle arm 85 whose other end is pivotally secured to a cross-head 86 slidably mounted, one at each side, to dove-tail guides 87 on the uprights 74. The toggle arms may conveniently be held on the trunnions 82 by means of retaining discs 85a and cap screws 85b as shown in Figs. 2 and 11. The rollers 83 are thus held in parallel relation regardless of the distance between them. In order to keep the rollers in close contact with the ingot, means are provided to force the swinging frames 80 and 81 toward the ingot comprising two connecting links 88 having a pivotal connection at one end to a shaft 89 passing through extensions 90 on the toggle arms 78 of swinging frame 80 and having a slidable and pivotal connection at an intermediate point with a similar shaft 91 passing through extensions 90 on the toggle arms 78 of swinging frame 81. A sleeve 92 surrounding shaft 89 assists in holding the arms 78 of frame 80 properly spaced when the nuts 93 at the ends of shaft 89 are tightened. Surrounding shaft 91 is a sleeve 94 having an inwardly threaded hollow extension 95 integral therewith (see Fig. 11). Sleeve 94 serves the same function as sleeve 92 in spacing the toggle arms 78 of frame 81 when the nuts 96 are tightened on the threaded ends of shaft 91 and additional functions as well, as will be clear from the following description. It will be seen from Figs. 10 and 11 that the shaft 91 is slidable in slots 97 in the links 88 and that a leaf spring 98, mounted in shackles 99 at the ends of the links 88 opposite the ends connected to shaft 89, tends to force the shaft 91 to the right through the medium of an adjusting screw 100 threaded at one end into the hollow extension 95 and rotatably mounted at the other end in a head 101 against which spring 98 bears. The connection between the shackles 99, the spring 98 and the links 88 may be made by bending the ends of the spring 98 and the ends of links 88 around shackle pins 99a. The head 101 is preferably loosely connected with the center of spring 98 by a bar 101a and cap screws 101b, as depicted in Figs. 10 and 11. Cross-bar 102 is welded or otherwise secured to the ends of links 88 adjacent the shackles to position and slidably hold the head 101. By rotating the screw 100, it is possible to adjust the pressure of the rollers 83 on the moving ingot to any desired extent and if a single leaf spring is not powerful enough it is evident that additional leaves may be used. Hand wheel 103 makes the rotation of adjusting screw 100 simple and easy for the operator.

At least one of the rollers 83 in the withdrawal device 69 is positively driven at a controllable speed, for example, by a variable speed electric motor 104 set on a bracket 105 mounted by any appropriate means on framework 68 (see Figs. 1 and 2). A gear 106 is keyed to the trunnion 82 at the adjacent end of the driven roller 83 and meshes with a pinion 107 keyed on a shaft 108. Bearings for shaft 108 are provided in the adjacent upright 74 and an auxiliary upright 109 also mounted on base 73. If necessary a third bearing (not shown) could be provided on framework 68. A gear 110 meshes with a pinion 111 on the motor shaft 112 and transmits the rotary motion of the motor shaft to shaft 108 on which gear 110 is keyed, thereby setting pinion 107, gear 106 and roller 83 in rotation. As rollers 83 are forced by spring 98 firmly into contact with the ingot, a positive withdrawing force is exerted which assures the safe and controlled withdrawal of the ingot at the proper rate of speed from the dynamic mold 13. In this way, the bottom of the mold is always filled with a solidified ingot and the top is filled with molten and freezing metal while the entire ingot and superimposed molten and freezing metal is supported in a positive manner during the molding operation. Accordingly, ruptures in the surface and body of the ingot are prevented and separation of the solid ingot from the metal undergoing freezing is prevented. In contrast to the foregoing it was necessary in prior art continuous casting apparatus for the ingot to be forcefully pulled or jerked from the mold, and whenever the freezing metal had adhered to the mold wall a rupture in the skin or body of the ingot would be produced. This difficulty in prior art processes has been entirely overcome in the present invention because sticking of the freezing metal to the mold walls is positively prevented by the transverse vibrations of the mold sections and the withdrawal device not only safely withdraws the ingot from the mold at a controlled rate coordinated with the speed of pouring and cooling but also supports the ingot and superimposed molten and freezing metal in a positive manner.

Satisfactory results have been obtained in practice when both rollers 83 of the withdrawal device 69 were power driven, and in Fig. 10 the necessary gears for accomplishing this result have been indicated in dotted lines. It is evident from this view that each roller 83 has a gear 106 keyed to the trunnion 82 and that each meshes with a pinion 107 suitably mounted on shafts 108 and 108a extending between the upright 74 and the auxiliary upright 109 so that they also mesh. The direction of rotation of each of these gears is indicated by the arrows in Fig. 10. If desired, shafts 108 and 108a may be made integral with the two stub shafts 76 at that side of the withdrawal device 69 and be rotatably mounted by bearing caps 77 in the same manner as hereinabove described in connection with the stub shafts 76.

Division or unit C comprises a framework 113, the lower end of which may be set in a suitable foundation (not shown). It is made sufficiently strong to give rigid and firm support to divisions or units A and B as well as to provide the mounting for a cut-off mechanism. The cut-off mechanism includes a carriage 114 having tongues 115 slidable in vertical grooves formed in the framework 113. A power saw 116 is mounted for horizontal movement on and vertical movement with the carriage 114. The power saw 116 comprises a frame 117 mounted for horizontal reciprocation on guides 118 on the carriage 114. On one of the vertical sides of frame 117 which lies parallel to the direction of motion along guides 118 an electric motor 119 is slidably mounted in vertical guides 120 and is capable of being locked in any desired position of adjustment along these guides by lock nuts 121. A pulley 122, keyed to the shaft of motor 119, is provided with a plurality of V-shaped grooves in its periphery. A similar pulley 123 is fixed to a shaft 124 suitably journaled in the frame 117. Endless V belts 125 pass around the pulleys 122 and 123 and transmit the torque of the motor 119 to shaft 124. In order to reduce the speed of rotation, a worm 126 is keyed to shaft 124 to drive a relatively large gear 127 on a vertical shaft 128 suitably journaled in the frame 117. A second vertical shaft 129 journaled in frame 117 carries a saw blade 130 at the upper end and a gear 131 which meshes with a similar gear 132 on the shaft 128. It will be observed from Fig. 13 that shaft 129 is near the right extremity of the frame 117 and that the saw blade 130 extends there beyond a distance somewhat greater than the largest dimension of the cross section of the ingot to be severed. It is for this reason that two vertical shafts have been used, because if gear 127 were on shaft 129 it would interfere with the operation of the saw. This difficulty is avoided by journaling the shaft 128 at the left of shaft 129 and by making the latter short enough that gear 127 can be placed below its lower end, as seen in Fig. 13.

The frame 117 of the power saw 116 is moved horizontally along the guides 118 on carriage 114 by means of a screw 133 rotatably mounted in a pedestal 134 at the right end of carriage 114 and which engages a nut 135 on the frame 117. Rotation is imparted to the screw 133 by a hand wheel 136 on a shaft 137 which also carries a worm 138 that meshes with a gear 139 on the screw 133. It will be clear to those skilled in the art that screw 133 could be mechanically driven, if desired.

The pedestal 134 carries a pair of laterally extending arms 140 at its upper end on which a shaft 141 is journaled. Shaft 141 is provided with a hand wheel 142 at one end which extends beyond the arm 140, a set of right hand threads 143 and a set of left hand threads 144. Clamp arms 145 are pivoted at one end to pedestal 134 by pins 146 and lugs 147 and carry nuts 148 and 149 at the other end which engage threads 143 and 144 respectively. Rotation of shaft 141 by hand wheel 142 will therefore cause the free ends of clamp arms 145 to move toward or away from each other. The opposed faces of the clamp arms 145 are provided with removable jaws 150 which are adapted to engage the ingot as it moves downwardly when hand wheel 142 is rotated in the proper direction. One set of jaws 150 may be shaped to clamp a circular ingot, casting or shape, another set to clamp a rectangular ingot, etc., and the proper set mounted in the clamp arms 145 to correspond to the shape of the ingot to be cast.

The carriage 114 is balanced by counterweights 151 connected to some convenient part of the carriage by ropes 152 passing over sheaves 153 suitably journaled in the framework 113 of division or unit C. When it is desired to cut off a length of the ingot, casting or shape, the operator turns hand wheel 142 to clamp jaws 150 tightly against the ingot, switches on the power to motor 119 and then turns hand wheel 136 to force the now rotating saw blade 130 through the ingot. It is evident that the carriage is moved downwardly at the same speed as the ingot so that the blade 130 may operate without binding and without interfering at all with the continuous molding carried out in the dynamic mold. As soon as the ingot is severed, hand wheel 136 is rotated in the opposite direction to return frame 117 to the original position whereupon the hand wheel 142 is rotated to release the jaws 150 and permit the carriage to be returned to its upper position.

A modified form of cooling device, illustrated in Figs. 14 and 15, has been advantageous under certain circumstances. A container designated generally by reference numeral 154 is adapted to be secured to framework 12 in the same relative position as container 62 shown in Figs. 1 and 2. The container 154 comprises an upper cylindrical casing 155 and a lower cylindrical casing 156 provided with a bottom wall 157 having an aperture 158 through which the ingot is adapted to pass. A yielding dam 159 having an opening preferably slightly smaller than the cross-section of the ingot or casing is secured to the bottom wall by a retaining ring 160 and machine screws 161. The dam 159 may be made of rubber, rubberized asbestos, felt, or similar material which will tightly embrace the ingot, casting or shape and thereby prevent excessive leaking of cooling fluid around the ingot as it moves out of the cooling container. An inlet connector 162 is provided near the bottom of the container 154 to which an inlet pipe communicating with any suitable source of supply may be connected, the cooling fluid flowing up around the ingot and spilling over the upper edge of the upper casing 155 into a trough or overflow basin 163 secured to the upper casing 155, as shown in Fig. 15. An outlet 164 is provided through which the fluid can be conducted to a drain pipe (not shown) from trough 163.

The upper and lower casings 155 and 156 are preferably flanged at their meeting ends to provide a fluid tight joint when bolted together by bolts 165 with an interposed gasket 166 of rubber, felt, asbestos, or the like.

Two sets of adjustable guide rollers designated generally by reference characters 167 and 168, respectively, are appropriately mounted within the casing 154. The rollers 169 of the upper set of guide rollers 167 may conveniently be provided with V-shaped grooves in their peripheries so as to receive and guide the longitudinal edges of the ingot, casting or shape as clearly shown in Fig. 14. It has been found advantageous in practice to make each of the rollers 169 of five freely rotatable discs, as may be seen in Fig. 14. In this way the difference in peripheral speed of the rollers at various points along the groove is largely eliminated and the surface of the ingot, casting or shape is not marred. The rollers 170 of the lower set of guide rollers 168 may have cylindrical surfaces to bear against the sides of the ingot. For convenience of illustration in elevation, Fig. 15 depicts the pairs of opposed rollers of the upper and lower sets in the same plane whereas the planes of the pairs of rollers there shown are actually offset 45°, as may be seen in Fig. 14. The part of Fig. 15 above line AB—AB is taken along the line B—B of Fig. 14 and the part below line AB—AB is taken along line A—A of the same figure.

A convenient means for rotatably securing the rollers 169 and 170 to the walls of the container comprises segmental blocks 171 fastened to the walls of the container by machine screws 172, U-shaped frames 173 pivotally mounted at each free end to one of the segmental blocks 171 by machine screws 174, and shafts 175 journaled in the arms of the frames 173 on which the rollers 169 and 170 rotate, as may be seen in Figs. 14 and 15. An apertured lug 176 is welded or otherwise secured to the cross member of each frame 173. Journaled in each apertured lug 176 is an adjusting screw 177 having a head 178 bearing against one side of the lug and a collar 179 bearing against the other side. The other end of each screw 177 is threaded through a tapped opening in the wall of the container 154 reinforced by a nut 180 welded thereto, whereby rotation of the screw 177 swings the roller journaled in the respective frame 173 toward or away from the ingot or casting. Lock nuts (not shown) may be used either inside or outside the container wall to lock the rollers in the proper position to guide the ingot or casting. It has been found convenient in practice to square the ends of the screws 177 to receive a wrench for turning the same. It will be apparent to those skilled in the art that the rollers 169 and 170 may be readily replaced by similar rollers having peripheral grooves contoured to fit any desired ingot, casting or shape; e. g., if the ingot were circular in cross-section the grooves in the peripheries of the rollers would have substantially the same radius of curvatrue as the ingot. This arrangement of guide rollers in close proximity to the dynamic mold provides lateral support to the ingot, casting or shape at the time when it is most needed.

It has been found in practice that currents of hot water rising in the container 154 around the ingot, casting or shape sometimes splash out of the container against the bottom of the mold. In order to prevent such undesirable splashing, a baffle plate 181 in the form of an annulus of sheet metal may be placed at the top of the overflow basin 163. A convenient means for holding the baffle plate 181 in position comprises bolts 182 welded to the periphery of the plate which seat in slots in the upper edge of the overflow basin 163, as seen in Fig. 14. Nuts 183 hold the baffle plate 181 in position.

A flange 184 is welded or otherwise secured to the container 154 to support the cooling device on the framework of division or unit A.

The apparatus is put into operation by filling the cooling channels 15 of the mold 13 with water, moving the mold sections 14 to the position of minimum clearance, placing the head of a dummy bar or starting plug at about one-third of the height of the mold up from the bottom, and then pouring molten metal into the chamber thus formed from furnace 1 and pouring vessel 7, as may be clearly seen from Fig. 1. After sufficient time has elapsed for the metal first poured to have solidified around a bolt, hook, or other device attached to the top of the dummy bar, the mold sections 14 are vibrated and the withdrawal mechanism 69 started. It has been found that satisfactory results are obtained by vibrating the mold sections from about 100 to about 1500 times per minute and having them move a very small distance, say, about two thousandths to about fifty thousandths of an inch. It is not essential to the production of ingots, casting or shapes free from fins, projections or the like that the mold sections actually touch in the position of minimum clearance. The rate at which the metal is withdrawn must be coordinated with the rate at which it is poured, and both of these rates must be governed by the cooling capacity of the machine. In other words, the ingot is continuously withdrawn as it solidifies and becomes self sustaining and at the same time is supported in a positive manner. Satisfactory sound continuous ingots, castings and shapes of copper have been produced at a rate within the range of about twelve inches to about twenty-four inches per minute in a two-section mold of the type illustrated in Fig. 3 in which the molding cavity had a cross-sectional area of about four square inches. In molds having a cross-sectional area of about nine square inches satisfactory results have been obtained at rates within the range of about nine to about fourteen inches per minute. It is to be understood that the aforementioned casting rates are illustrative only and are not to be construed as limiting the process either to the stated minimum or maximum rate. Beneath the vibrating mold the cooling device 61 or 154 containing water, brine, or other suitable fluid may be arranged to dissipate excess heat of the metal which is not removed in the mold. The dummy bar or starting plug is moved gradually downwardly until the ingot itself reaches the cut-off mechanism 113. The dummy bar is then disconnected and set aside for re-use when the apparatus is again set into operation. The pouring is preferably conducted continuously and a dense continuous casting in the form of, say, a cast copper bar is produced which may be cut into suitable commercial lengths for further operations such as rolling, drawing, piercing, etc. It is clear that in case a continuous bar, strip or sheet were desired, the cut-off mechanism 113 could be replaced by suitable means to work the ingot into the desired shape, as those skilled in the art will understand.

As a specific example of the process of the present invention, a 2350 pound charge of tough pitch copper, prepared in an electric furnace, was cast in a two section copper mold having a casting cavity about 3" x 3" in cross-section and about 9 inches long, in 78.7 minutes to produce an ingot, casting or shape 840 inches long. The mold sections were vibrated at a frequency of about 1020 oscillations per minute a distance of about 0.008 of an inch with a minimum clearance of about 0.004 of an inch. Cooling water entered the cooling channels of the mold sections at a temperature of about 36° F. and flowed out at a temperature of about 48° F. The flow of water amounted to about 20 Imperial gallons per minute.

It has been found that the present process produces, for instance, a dense copper ingot, casting or shape superior in the symmetry of its metallographic structure in cross section and in its longitudinal uniformity of structure, composition and properties to copper prepared for casting in the same manner but which was cast in stationary vertical or horizontal molds. The surface appearance of the cast copper ingot of the present invention is satisfactory, being completely free from cracks, fissures, cold sets or shuts and other defects. The ingot, casting or shape is straight and uniform in size throughout its length and is free from "set" ends which have to be cropped off and from surfaces requiring "scalping."

In cross-section the macrostructure of the ingot or casting is characterized by a narrow band of equiaxed "chill crystals" extending from the edge to a depth of about ⅜", a zone of "sunburst" crystals or radial crystal aggregates growing in columnar form toward the cooling center of the casting, and a central zone of relatively small extent comprising columns of crystals growing within the "sunburst" or radial columns along the longitudinal axis of the ingot or casting, as may be seen in Figs. 16 and 17. The radial columns grow substantially perpendicular to the adjacent side of the casting. Regardless of the length of the ingot, casting or shape produced, its structure is substantially uniform throughout the whole length, the section depicted in Fig. 17 being typical of the macrostructure on a longitudinal section through the axis of the ingot. No cracks, fissures, pipes, shrinkage cavities, or like defects are present in the ingots, castings or shapes produced in the apparatus and by the process embodying the present invention.

When tough pitch copper is cast in the apparatus and by the process embodying the present invention, an ingot, casting or shape is produced having high average density combined with satisfactory and acceptable uniformity of density across the cross-section and throughout the length of the ingot, casting or shape. The cast bars of the present invention are characterized by having the highest density in a zone of considerable cross-sectional area along and surrounding the longitudinal axis of the bar. While somewhat lower in density than the central zone, the outer zones are free from objectionable porosity and have in general a higher density than corresponding outer zones of prior vertical cast bars. It is to be noted that the slightly lower density of the outer zones does not detrimentally affect the merchantability of the bars of the present invention and does not adversely affect the working of the bar or the subsequent fabrication thereof into acceptable and satisfactory articles of manufacture. In contrast to the aforesaid, a bar of the same copper cast in conventional vertical molds exhibited lower density across the entire section with lowest density in a zone near the center or axis of the bars. The average density of the tough-pitch copper cast in accordance with the teachings of the present invention is about 8.83 as compared with about 8.73 when cast in vertical and about 8.5 when cast in horizontal molds. In prior horizontal and vertical cast bars, moreover, the density varies with the distance from the bottom of the casting whereas the bars of the present invention have consistently uniform high density along the whole length.

Microscopic examination of the structure of tough-pitch copper castings produced by the method embodying the present invention reveals the presence of a very thin "skin" at the surface of the ingot, casting or shape comprising small copper crystals surrounded by Cu-Cu₂O eutectic. The thickness of this skin is generally about 0.008 inch but may vary from less than this value to about 0.04 inch. The oxygen content of this skin averages about 0.15%. Immediately below the skin, the oxygen content drops abruptly to a value which is practically constant throughout the cross section, although tending to increase slightly adjacent the longitudinal axis of the casting. The average oxygen content of the ingots, castings or shapes of the present invention, however, is lower than the average content of vertical wire bars cast from the same metal. For example, oxygen analyses across the cross-section of square wire bars cast in vertical molds and in the present dynamic mold were as follows:

*Percentage oxygen content*

| Position | Stationary mold | Dynamic mold |
|---|---|---|
| Skin | 0.103 | 0.163 |
|  | 0.023 | 0.022 |
| Center | 0.034 | 0.023 |
|  | 0.031 | 0.030 |
|  | 0.033 | 0.022 |
|  | 0.024 | 0.021 |
| Skin | 0.103 | 0.163 |

Figure 18:
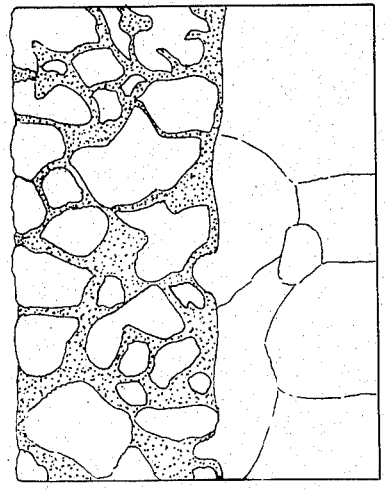
Fig. 18 depicts the structure of the casting in horizontal section near an edge, at a magnification of about 200 diameters.

In conventional vertical cast wire bars, moreover, there was a higher oxygen content near the top than adjacent the bottom. In one bar, for example, the oxygen contents adjacent the bottom, at the center and near the top were 0.033%, 0.040% and 0.045% respectively. The continuous castings of the present invention exhibit no longitudinal segregation and the oxygen content of samples taken at intervals over very long lengths is substantially uniform. For example, one casting forty seven feet six inches long was tested at intervals along its length, and the oxygen content did not vary more than about 0.001% from the average content of 0.021%. Although the mechanism of the phenomena involved in the present invention has not been fully determined, it is believed that a possible explanation of the formation of the unique structure of the cast bars of the present invention may be that since there is at all times a continuous pool or inverted cone of molten metal at the top of the casting within the mold, the growing crystals constituting the solid casting may at all times be supplied with pure metal from which to grow. Furthermore, the constant supply of molten metal during the solidification contraction of the growing crystals insures that there can be no cavities nor discontinuities in the crystal structure. By supplying molten metal to the mould in a steady continuous stream, the level of the molten metal in the mould is maintained substantially constant, thus eliminating all possibilities of cold sets, splash marks, or other defects well known to those experienced in the art of casting metals. A further feature of the steady, even supply of metal to the mould is that it permits a stable meniscus to form on the metal at the mould wall, over which the metal continuously feeds as the lower portion of the meniscus is frozen against the mould wall. In this manner a uniform, smooth, continuous skin, substantially free from defects, is formed, the metal readily flowing from the centre of the mould outward to the mould wall, over the meniscus and thereafter becoming the outer surface, or skin, of the casting. The appearance of the structure of the skin may be seen in Fig. 18 which is reproduced from a photomicrograph taken at a magnification of 200 diameters. The specimen was given a light ammonia etch.

Immediately below the skin is located the above mentioned band of chill crystals. The sharpness of the structural transition from the skin to this zone is clearly depicted in Fig. 18, and from this figure, as well as Fig. 19 the general nature of the structure of this zone may be seen. Fig. 19 is reproduced from a photomicrograph taken at a magnification of 100 diameters about ⅛" below the surface. The grains are equiaxed and vary somewhat in size, becoming larger and merging gradually into the zone of elongated radial crystal aggregates which constitutes the major portion of the casting.

The radial macrograins shown in Fig. 16 are bundles or aggregates of similarly oriented micrograins, as may be seen in Fig. 20 which was copied from a photomicrograph taken at a magnification of 100 diameters about ½ inch in from an edge of the casting. The crystals or grains shown in Fig. 20 are all within one macrograin. It will be seen that the micrograins are elongated and oriented. Like the macrograins, the micrograins of this zone are substantially perpendicular to the adjacent face of the casting. Although the micrograins vary somewhat in size, Fig. 20 is typical of the structure throughout the zone of radial crystals.

The vertical crystals of the center zone seen in Figs. 16 and 17 are also columnar aggregates of micrograins, very similar to those of the radial zone except for the different orientation. In the center zone the micrograins are oriented along the longitudinal axis of the casting. In horizontal section the grain boundaries of the micrograins present an angular appearance, as is illustrated in Fig. 21 which was reproduced from a photomicrograph taken at 750 diameters magnification.

From the aforesaid description of the copper ingots, castings or bars molded in accordance with the process of the present invention, it will be clear that in cross section they are characterized by metallographic structure comprising four distinct zones, viz., the outer skin, the narrow band of equiaxed chill crystals, the zone of radial crystal aggregates, and the center zone of longitudinal crystal aggregates; that the zone of highest density surrounds the longitudinal axis which, in prior art vertical castings or bars, was the zone of lowest density; and that their composition, structure and properties are substantially uniform and constant throughout their length, whereas prior art vertical or horizontal cast bars varied appreciably in composition, structure and properties from the bottom to the top. Stated in other words, the ingots, castings, shapes or bars of the present invention are characterized by the unique combination of cross-sectional symmetry and longitudinal uniformity of composition, structure and properties. This important combination of features is impossible to obtain in ingots, castings or bars cast in vertical or horizontal molds, and as a consequence new results are achieved in the manufacturing and physical properties of the metal cast in the apparatus and according to the process embodying the present invention. In order to illustrate the advantages and benefits to be obtained in this regard from the present invention, the following specific example is given of manufacturing and physical tests performed on five tons of tough-pitch copper bars cast as described hereinabove. These bars were 3" square in cross-section with well radiused corners, as illustrated in Fig. 16. They were cut in 54" lengths and the bars were double pointed to facilitate rolling, as those skilled in the art will understand.

A. MANUFACTURING PROPERTIES

1. Hot rolling

The bars were hot rolled to both ¼" and ⅛" rod, employing a starting temperature of about 800° C. One bar was rolled to hot rolled strip of dimensions 0.232" x 1.125". In all cases the copper behaved satisfactorily, no trouble of any kind being encountered.

2. Open furnace annealing and cleaning

Where open furnace annealing was carried out the material behaved in a thoroughly satisfactory manner. Pickling was carried out readily in hot dilute sulphuric acid when performed in the normal manner.

3. Drawing

Rods of both ¼" and ⅛" sizes were drawn to various sizes of wire upon the machines usually employed for the particular size in question and no trouble of any description was met with during this part of the process, not a single break being recorded.

Eleven bars had been rolled to ¼" diameter rod and of these five were drawn continuously at high speed to .066" and six to .097", the following drafts being used:

Drafts used in drawing 0.066" wire from 0.250" rod

| | |
|---|---|
| .210" | .090" |
| .174" | .080" |
| .144" | .072" |
| .120" | .066" |
| .100" | |

Drafts used in drawing 0.097" wire from 0.250" rod.

| | |
|---|---|
| .195" | .122" |
| .163" | .107" |
| .138" | .097" |

4. Cold rolling

The above mentioned 0.232" x 1.125" hot rolled strip was annealed in an open furnace, pickled, drawn to 0.145" x 1", and then annealed for about 1½ hours in a steam atmosphere in a muffle furnace at about 420° C. It was then passed to 2-high cold rolling mills and was rolled in three passes to .0625″ with semi circular edges, grooved edging rolls being used in each case. The coil was then annealed in an electric furnace at a temperature of 380° C. for a period of one hour, using an inert atmosphere. The results were exceptionally good, being superior to those obtainable with horizontal or vertical wire bars of the prior art. In order to test the strip for edge cracks or defects, test specimens 24″ long taken from each end of the coil were bent on edge round a radius of ¼″ through an angle of 180°. The bending apparatus was so made that the test pieces were bent without any tension although no side movement was permitted. A lubricant was applied before commencement of the test to ensure evenness of bending. All the specimens successfully withstood the ½″ diameter bend without any signs of distress. As this diameter is about one half the width of the specimen, the result shows absence of cracks and defects and a high capacity for edge bending.

In order further to test the cold rolling properties, one of the coils of 0.097″ hard drawn wire referred to hereinabove was divided into seven lengths and cold rolled on a 10″ diameter 2-high mill at a speed of approximately 300 feet per minute in a single pass without edge support to the dimensions given in Schedule I.

SCHEDULE I

| Specimen No.— | Thickness after rolling | Approximate width after rolling |
|---|---|---|
| 1 | .050″ | .146″ |
| 2 | .040″ | .173″ |
| 3 | .035″ | .195″ |
| 4 | .031″ | .218″ |
| 5 | .025″ | .260″ |
| 6 | .021″ | .308″ |
| 7 | .015″ | .360″ |

The edges were carefully examined for side cracking at all stages using a hand glass of low power. No cracks could be detected on any of the samples. The material thus possesses exceptional resistance to edge cracking.

5. *Bright annealing*

During the final annealing process in an inert atmosphere, the copper behaved in a completely acceptable manner and the resulting products were perfectly satisfactory.

B. Physical Properties

1. *Hard drawn wire tests*

Test pieces were taken from the ends of each coil of wire drawn from the ¼″ rods of the eleven bars mentioned hereinabove and mechanical tests were applied in accordance with B. S. S. 174. The breaking load was determined upon a 2000-lb. Denison hand operated beam testing machine. Twist tests were taken upon a length of 3″ using a hand operated twisting machine. Wrapping tests were also taken, the wire being wrapped round its own diameter six times, unwrapped again and again wrapped in the same direction, unwrapping and wrapping until the wire fractured; the figure shown in the table of test results indicates the number of times which the wire was wrapped and unwrapped and the index figure indicates the turn upon which the wire eventually broke. The results of these tests are set forth in Schedule II.

SCHEDULE II
*Mechanical tests*

| Bar No.— | Diameter | Breaking load | Twists | Wraps |
|---|---|---|---|---|
| .097″ HARD DRAWN WIRE | | | | |
| B. S. S.* | Inch .0969 | Pounds 490 | Number 25 | Number 3 |
| 1 | .097 | 496 500 | 66 55 | 5¹ 4² |
| 2 | .097 | 502 497 | 70 63 | 5² 6 |
| 3 | .097 | 499 497 | 68 65 | 6 6⁴ |
| 4 | .097 | 496 499 | 49 66 | 5⁴ 5 |
| 5 | .097 | 493 490 | 62 64 | 6 5² |
| 6 | .097 | 492 497 | 60 60 | 6 5² |
| SCHEDULE III .066″ HARD DRAWN WIRE | | | | |
| B. S. S.* | .0662 | 230 | 35 | 3 |
| 7 | .066 | 256 247 | 92 70 | 3¹ 3¹ |
| 8 | .066 | 260 249 | 92 107 | 3¹ 5¹ |
| 9 | .066 | 256 253 | 93 108 | 3² 3⁸ |
| 10 | .066 | 257 258 | 92 76 | 4⁴ 3¹ |
| 11 | .066 | 248 254 | 83 91 | 3⁴ 3 |

*B. S. S. designates British Standard Specification (No. 174 of 1927).

The figures for both twists and wraps are excellent. In the case of the .097″ wire it is the wraps which are most exceptional whilst the twists recorded for the .066″ wire are unusually high.

C. Electrical Conductivity

A sample from each of the coils prepared for the hard drawn wire tests at .097″ and .066″ was annealed in an inert atmosphere furnace at a temperature of about 330° C. for approximately one hour.

The resistance of a 36.00″ test piece, immersed in an oil bath, the temperature of which could be read to an accuracy of 0.1° C., was measured by means of a Tinsley 5-dial bridge, using a .001 ohm resistance as standard. Each test piece was weighed to 5 significant figures and the conductivity was calculated as a percentage of the I. E. C. standard for annealed copper. The results are tabulated in Schedule IV.

SCHEDULE IV
Conductivity Results

| .097″ diameter wire | | .066″ diameter wire | |
|---|---|---|---|
| Bar No.— | Conductivity | Bar No.— | Conductivity |
| | Per cent | | Per cent |
| 1 | 100.9 101.0 | 7 | 100.8 101.0 |
| 2 | 101.1 101.0 | 8 | 100.8 101.0 |
| 3 | 101.2 101.3 | 9 | 100.7 100.7 |
| 4 | 101.2 101.0 | 10 | 101.0 100.9 |
| 5 | 101.0 100.9 | 11 | 100.7 100.8 |
| 6 | 101.2 101.1 | | |

It will be seen that the conductivity is satisfactory for tough-pitch copper.

It will be apparent to those skilled in the in the art that the bars of copper cast according to the process embodying the present invention are of exceptionally fine quality, that they have excellent working properties, and that the mechanical and physical properties of the products are at least and in some respects superior to copper cast according to prior art methods. The combination in the cast bars of the present invention of structural symmetry in cross-section and of longitudinal uniformity of structure and composition is believed to account, at least in part, for the new results in workability and properties of the copper cast as hereinabove described. The presence, moreover, of the zone of somewhat lower density in a narrow band adjacent the outer surface and the zone of highest density in the center of the ingots, castings and bars of the present invention is a distinct advantage over the conventional vertical cast bars which are lower in density over the whole cross-section with the lowest density in the center zone. It is well recognized that in working metal to smaller sizes, for example by forging, rolling and drawing, the metal adjacent the outer surface is ordinarily worked to a greater extent than that at the center. The bars of the present invention, in which the zone of somewhat lower density coincides practically with the zone where greatest working occurs, assure a sound worked product that has satisfactory density.

The present invention is applicable also to the production of hollow ingots, castings and shapes. A suitable apparatus for carrying out this modification of the invention is illustrated in Figs. 22 and 23 in which the mold and associated parts for supporting and vibrating it are constructed in the same manner as the apparatus for casting solid ingots, castings or shapes which has been described in detail hereinabove in connection with Figs. 1, 2, 3, and 4. This description need not be repeated here as the corresponding parts have been given the same reference numerals. In order to simplify the views, the framework for supporting the parts has been omitted and the vibrating mechanism for only one mold section is shown. It will be understood, however, that each mold section and each core section are provided with vibrating means similar to that shown in Figs. 22 and 23.

The mold and core illustrated in Figs. 22 and 23 form a somewhat annular casting cavity adapted for casting ingots or shapes that are circular in cross-section and which have a concentric bore. It will be obvious to those skilled in the art, however, that the inner and outer walls of the tube may be contoured as desired and that the walls need not be of uniform thickness. Such shapes are to be understood as coming within the scope of the term "annular cavity," or "hollow shapes."

The bore of the tubular ingot, casting or shape is formed by a dynamic core 213 comprising sections 214 which are preferably adapted to mate along the plane of the mating mold sections 14, as may be seen in Fig. 22. The core sections 214 may be provided with ducts for cooling fluid, if desired, and are of sufficient length to extend from a position adjacent the bottom of mold 13 some distance above the top thereof, as illustrated in Fig. 23. Secured to the extending portion of the core section 214 is the head of a T-shaped core supporting member 218 which is adapted to reciprocate in a bearing 220 suitably mounted on the framework of division or unit A. Reciprocatory movement is imparted to member 218 by a rotating eccentric designated generally by reference number 227 through a connecting rod 229. The connecting rod is articulated to the core supporting member 218 by means of a crosshead 230 and a wrist pin 231, as shown in Figs. 22 and 23. The ends of the connecting rod 229 are advantageously provided with right and left hand threads which are screwed into suitably drilled and tapped openings in cross head 230 and an eccentric head 232. Locknuts 233 lock the connecting rod and associated parts in any desired position of adjustment. Eccentric head 232 may have substantially the same structure as eccentric head 32, being provided with a shoulder on which an outer race 234 of a ball bearing 235 may rest and be securely held by a clamp plate 236 and cap screws 237. Clamp plate 236 may also serve as a top closure for the assembly. The disc 50, shown in Fig. 4, is dispensed with and the eccentric end 51 of shaft 39 is extended vertically into the eccentric 227, as shown in Fig. 23. The eccentric ring 49 may be secured in the desired position of adjustment by a set screw, or the like. An inner race 248 of ball bearing 235 is held by flanged eccentric ring 249 and disc 250. Cap screws 250a secure disc 250 firmly to the end of shaft 39. A set screw 252 may be used to lock the eccentric ring 249 in any desired position of angular adjustment with reference to eccentric end 251 of shaft 39. The center of eccentric 251 is offset 180° with respect to the center 51c of eccentric 51, but otherwise the relation of parts 251 and 249 to the shaft 39 is the same as parts 51 and 49. Rotation of shaft 39, therefore, produces reciprocation of the connecting rods 29 and 229 in opposite directions, i. e., 180° out of phase with each other. The extent of movement of the connecting rods 29 and 229 is governed by the angular setting of eccentric rings 49 and 249, respectively.

The operation of the apparatus illustrated in Figs. 22 and 23 is not essentially different from the operation of the apparatus depicted in Figs. 1, 2, 3 and 4. To start the machine, a dummy bar is placed in the bottom of the mold, molten metal is poured into the annular cavity, the cooling fluid is turned into the channels in the mold and core sections, the mold and core sections are vibrated, and, when the metal at the bottom has solidified, the hollow casting, ingot, or shape is withdrawn at a speed correlated with the rate of pouring and cooling, all as more fully described hereinabove for the apparatus shown in Figs. 1, 2, 3 and 4. It will be clear from the foregoing description of the apparatus that the distance between a mold section and the adjacent core section alternately increases and decreases due to the 180° displacement of the eccentrics 27 and 227. The mold sections 14 are at the point of minimum clearance with respect to each other when the core sections are at their point of maximum clearance and vice versa. The extent and frequency of the transverse movements of the mold and core sections are substantially the same when tubes or hollow shapes are being cast as recommended above for solid ingots, castings and shapes, viz., about 2 to 50 thousandths of an inch movement at frequency of about 100 to 1500 vibrations per minute. The continuous hollow ingots, casting or shapes are characterized by structural symmetry in cross-section and longitudinal uniformity in structure, density, chemical content, physical properties, etc. These continuous hollow ingots or shapes may be severed, as above described for the solid ingots, castings and shapes, into convenient lengths, either for use as pipe in the cast condition or for further processing such as extruding or rolling into seamless tubing, etc. The hollow shapes produced in accordance with the present invention are particularly adapted for such extruding, drawing and rolling processes inasmuch as it is unnecessary to pierce them.

It will be apparent to those skilled in the art that the present invention offers many advantages and improvements over the commercial practices of the prior art. Castings of practically unlimited length may be produced by the present invention whereas the length of castings was limited by practical and technical consideration in both horizontal and vertical molds. As a result, the losses due to scalping of horizontal bars and to cropping of the set ends of vertical bars are completely eliminated by the present invention. The amount of copper tied up in mold stock is much less in the apparatus of the present invention, for a given production rate, than in either the horizontal or vertical wire bar casting machines. Moreover, the elimination of practically all variables in the process of the present invention results in a higher degree of product uniformity than heretofore attainable. For example, in casting a vertical bar by the prior art process, the rate of cooling during the filling of the mold varied widely, the hydrostatic pressure of molten metal underwent a continuous change, the time of exposure of the molten stream of metal to atmospheric oxidation in traveling from the ladle spout to the end of the rising pool in the mold decreased as the mold was filled. All these variables are eliminated in the present process in which the rate of cooling, the hydrostatic pressure of molten metal and the time of exposure of the molten stream of metal to the atmosphere are practically constant. Moreover, the apparatus of the present invention lends itself to atmosphere control of the molten metal in the furnace or ladle and during pouring and solidification more readily than conventional casting machines. As a result, ingots, castings, shapes, or bars of hitherto unattainable uniformity may be regularly produced under commercial conditions and on an industrial scale.

The description of the results has been confined largely to copper, but other metals and alloys can be cast in the apparatus and according to the process of the present invention. Thus, yellow brass, bronze, nickel, nickel-copper alloys, steels, etc., may be cast as hereinbefore described for copper. Certain changes in the length of the mold, rate of withdrawing the casting, amount of cooling water supplied to the mold, etc., have to be made to take care of differences in the melting point, latent heat, thermal conductivity, etc., of the various metals and alloys.

It is to be observed that the present invention provides a novel process for producing copper superior in quality to electrolytic copper as produced by copper refineries generally. In order to illustrate the benefits and advantages that may be attained from the present invention, the following tables of comparative data are given between electrolytic copper in the form of horizontal and vertical cast bars and electrolytic copper in the form of a new continuously molded bar. The copper was made from ordinary electrolytic copper as produced in accordance with the customary practice of copper refineries generally. The copper was prepared for casting and was cast in horizontal and vertical molds according to standard commercial practice for tough pitch copper. The data show the superiority in quality of the copper cast in accordance with the present invention over the prior art electrolytic copper as produced by copper refineries generally.

*Table I*

DENSITY OF TOUGH PITCH ELECTROLYTIC COPPER IN CROSS-SECTION OF BAR

| Position | Prior horizontal wire bar* | Prior vertical wire bar** | New continuous wire bar** |
|---|---|---|---|
| Near edge | (Top) 8.30 | 8.74 | 8.77 |
| Halfway to center | 8.31 | 8.75 | 8.77 |
| Center | 8.35 | 8.72 | 8.86 |
| Halfway from center | 8.50 | 8.74 | 8.78 |
| Near other edge | | 8.73 | 8.79 |
| Average | 8.42 | 8.74 | 8.80 |

* Taken at the midsection.
** Taken near the bottom end.

*Table II*

DENSITY OF TOUGH PITCH ELECTROLYTIC COPPER ALONG LENGTH OF BAR

| Prior vertical wire bar | | New continuous wire bar* | |
|---|---|---|---|
| Position | Density | Position | Density |
| Bottom | 8.75 | First 114" | 8.80 |
| About 11" from bottom | 8.71 | Second 114" | 8.84 |
| About 22" from bottom | 8.66 | Third 114" | 8.85 |
| About 33" from bottom | 8.59 | Fourth 114" | 8.86 |
| About 44" from bottom | 8.44 | Last 114" | 8.87 |
| Top | 8.17 | | |
| Average | 8.57 | Average | 8.85 |

*The continuous bar was 47' 6" long.

*Table III*

OXYGEN CONTENT OF TOUGH PITCH ELECTROLYTIC COPPER IN CROSS-SECTION OF THE BAR

| Position | Prior horizontal wire bar | Prior vertical wire bar | New continuous wire bar |
|---|---|---|---|
| | Per cent | Per cent | Per cent |
| Near edge | (Top) 0.125 | 0.023 | 0.022 |
| Half way to center | 0.030 | 0.034 | 0.023 |
| Center | 0.025 | 0.031 | 0.030 |
| Half way from center | 0.021 | 0.033 | 0.022 |
| Near other edge | | 0.024 | 0.021 |

In addition to the determination of the oxygen content, a detailed examination was made on the prior horizontal cast and vertical cast bars and the new bar from the surface toward the center. The samples were cut from the middle portions of representative bars. The horizontal wire bar was cleaned and the crown "set" milled off until the top surface was horizontal before taking the samples. The sections of the three bars were then milled in alternate 0.020 inch and 1/16 inch cuts, the former being sampled and assayed for oxygen, sulphur and copper. The results are as follows:

Table IV
OXYGEN, SULPHUR AND COPPER CONTENTS

| Prior horizontal wire bar | | | Prior vertical wire bar | | | New continuous wire bar | | |
|---|---|---|---|---|---|---|---|---|
| O | S | Cu | O | S | Cu | O | S | Cu |
| Per cent | Per cent | Per cent | Per cent | Per cent | Per cent | Per cent | Per cent | Per cent |
| 0.058 | 0.0020 | 99.923 | 0.103 | 0.0028 | 99.796 | 0.163 | 0.0028 | 99.821 |
| 0.040 | 0.0013 | 99.957 | 0.051 | 0.0023 | 99.918 | 0.048 | 0.0016 | 99.946 |
| 0.032 | 0.0014 | 99.961 | 0.041 | 0.0012 | 99.945 | 0.036 | 0.0006 | 99.957 |
| †0.028 | 0.0012 | 99.965 | 0.049 | 0.0014 | 99.939 | 0.037 | 0.0007 | 99.954 |
| †0.027 | 0.0019 | 99.966 | 0.041 | 0.0015 | 99.945 | 0.036 | 0.0010 | 99.956 |
| 0.046 | 0.0017 | 99.948 | 0.039 | 0.0013 | 99.949 | 0.035 | 0.0011 | 99.958 |
| †0.033 | 0.0010 | 99.957 | 0.040 | 0.0014 | 99.947 | 0.035 | 0.0008 | 99.954 |
| 0.043 | 0.0010 | 99.951 | | | | | | |
| 0.035 | 0.0009 | 99.959 | | | | | | |
| 0.027 | 0.0008 | 99.966 | | | | | | |
| 0.033 | 0.0014 | 99.957 | | | | | | |
| 0.027 | 0.0015 | 99.965 | | | | | | |
| 0.020 | 0.0010 | 99.971 | | | | | | |
| 0.018 | 0.0016 | 99.972 | | | | | | |

†Estimated from copper analysis.

Table V
OXYGEN CONTENT ALONG LENGTH OF BAR

| Prior vertical wire bar | | New continuous wire bar* | |
|---|---|---|---|
| Position | Oxygen | Position | Oxygen |
| | Percent | | Percent |
| Near bottom | 0.033 | Near start | 0.021 |
| At middle | 0.040 | At middle | 0.022 |
| Near top | 0.045 | Near end | 0.021 |
| Variation | 0.012 | Variation | 0.001 |

*The continuous bar was 47' 6" long.

Table VI
VICKERS PYRAMID NUMBERS OF TOUGH PITCH ELECTROLYTIC COPPER IN CROSS SECTION OF VERTICAL BAR

| Position | Prior vertical wire bar | New continuous wire bar |
|---|---|---|
| Surface* | 41.7 | 57.1 |
| About ¼" from edge | 41.8 | 44.5 |
| About 1" from edge | 42.3 | 46.4 |
| At center | 47.4 | 58.8 |

*Oxide removed by etching.

Table VII
VICKERS PYRAMID NUMBERS OF TOUGH PITCH ELECTROLYTIC COPPER IN CROSS-SECTION OF PRIOR HORIZONTAL BAR

| | |
|---|---|
| ⅜" below set on center line | 44.0 |
| 1.5" below set on center line | 38.6 |
| 1.5" below set 1" from one side | 39.3 |
| 1.5" below set 1" from other side | 33.2 |
| ½" up from bottom on center line | 53.7 |
| On side edge* | 38.2 |

*Oxide removed by etching.

Although the invention has been described in considerable detail with respect to a preferred embodiment, it will be understood that various modifications and variations may be resorted to as those skilled in the art will readily understand. Such modifications and variations are to be considered within the scope of the invention as described by the specification and defined by the appended claims. Thus, when the term "metal ingot, casting or shape" is used in the claims, it is to be understood to include within its scope an ingot, casting, shape or the like produced of any ferrous or non-ferrous metal or alloy, including steel.

We claim:

1. In the production of continuous ingots, castings and shapes of metals and alloys substantially free from cracks, ruptures, fissures and like defects arising from the adherence of the solidifying metal to the walls of the mold chamber, the steps comprising moving molten metal as a longitudinal stream through a cooling and molding chamber, abstracting heat from said metal to cause progressive solidification thereof, increasing and decreasing the cross section of the space within said chamber during the abstraction of heat and solidification of the metal by rapidly vibrating the walls thereof to prevent adherence of solidifying metal thereto, and continuously withdrawing the solidified metal from said molding chamber in the form of a continuous ingot, casting or shape.

2. In the production of a continuous ingot, casting or shape of metal or alloy, the steps comprising feeding molten metal into a confining space, abstracting heat from the molten metal to progressively solidify the same, increasing and decreasing the cross section of said space during abstraction of heat at a frequency of about 100 to about 1500 vibrations per minute whereby adherence of the solidifying metal to the walls of said space is prevented, and withdrawing the solidified metal or alloy in the form of a continuous ingot, casting or shape.

3. The process of producing a continuous ingot, casting or shape by progressive solidification of molten metal in a mold comprising pouring molten metal into the mold, supporting the molten metal in the mold, abstracting heat from the molten metal to solidify the same progressively, preventing adherence of the metal to the mold walls by rapidly varying the cross section of the mold, and continuously withdrawing the solidified metal from the mold.

4. The process of producing an ingot, casting or shape by solidification of molten metal in a mold, comprising supporting a column of molten metal in the mold, abstracting heat from the molten metal to solidify the same, rapidly varying the cross sectional area of the mold during abstraction of heat to prevent adherence of the metal to the mold, and withdrawing the solidified metal from the mold.

5. A process of casting ingots, castings and shapes of metals and alloys comprising pouring molten metal into a cooling and molding chamber, abstracting heat from said metal to solidify the same, preventing adherence of the metal to the chamber walls by increasing and decreasing the cross section of the space within said chamber during the abstraction of heat and the solidification of the aforesaid metal, and withdrawing the solidified metal from said chamber.

6. The process of producing a continuous hollow ingot, casting or shape by progressive solidification of molten metal in a mold provided with a core, said process comprising pouring molten metal into the mold, supporting molten metal in the mold, abstracting heat from the molten metal to solidify the same progressively, preventing adherence of the metal to the mold walls and core walls by rapidly varying the cross section of the mold and core, and continuously withdrawing the solidified metal from the mold.

7. The process of producing a hollow ingot, casting or shape by solidification of molten metal in a mold having a core, said process comprising supporting a hollow column of molten metal in the mold, abstracting heat from the molten metal to solidify the same, preventing adherence of the metal to the mold walls by rapidly varying the cross section of the mold, and withdrawing the solidified metal from the mold.

8. The method of preventing metal from adhering to mold walls during solidification comprising vibrating the mold walls to increase and decrease the cross section of the mold cavity while the metal therein is solidifying.

9. The method of shaping and solidifying molten metal against a cooling and shaping surface without adherence of the solidifying metal to said surface which comprises laterally supporting the molten metal only intermittently by said cooling and shaping surface.

10. In the production of a continuous ingot, casting or shape of metal or alloy, the steps comprising feeding molten metal into a cooling and molding space, supporting the metal laterally only intermittently whereby adherence of the metal to the walls of said space is prevented, progressively solidifying the molten metal by abstracting heat largely transversely while the metal is laterally supported, and withdrawing the solidified metal or alloy in the form of a continuous ingot, casting or shape.

11. In the production of a continuous hollow ingot, casting or shape of metal or alloy, the steps comprising feeding molten metal into a cooling and molding space provided with a core, supporting the metal laterally only intermittently whereby adherence of the metal to the walls of said space is prevented, progressively solidifying the molten metal by abstracting heat largely transversely while the metal is laterally supported, and withdrawing the solidified metal or alloy in the form of a continuous hollow ingot, casting or shape.

ALBERT WELBLUND.
FRED BENARD.